(12) United States Patent
Svensson

(10) Patent No.: US 10,315,630 B2
(45) Date of Patent: Jun. 11, 2019

(54) METHOD FOR OPERATING A VEHICLE BRAKING ASSIST SYSTEM

(71) Applicant: Ford Global Technologies, LLC, Dearborn, MI (US)

(72) Inventor: Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/584,910

(22) Filed: May 2, 2017

(65) Prior Publication Data

US 2017/0320474 A1 Nov. 9, 2017

(30) Foreign Application Priority Data

May 3, 2016 (DE) ........................ 10 2016 207 581

(51) Int. Cl.
| | | |
|---|---|---|
| *G05D 1/00* | (2006.01) | |
| *B60T 7/22* | (2006.01) | |
| *B60T 7/04* | (2006.01) | |
| *B60T 8/172* | (2006.01) | |
| *B60T 8/1755* | (2006.01) | |
| *B60T 13/16* | (2006.01) | |
| *B60T 17/02* | (2006.01) | |

(52) U.S. Cl.
CPC ............... *B60T 7/22* (2013.01); *B60T 7/042* (2013.01); *B60T 8/172* (2013.01); *B60T 8/1755* (2013.01); *B60T 8/17551* (2013.01); *B60T 13/161* (2013.01); *B60T 17/02* (2013.01); *B60T 2201/022* (2013.01); *B60T 2201/03* (2013.01); *B60T 2220/04* (2013.01); *B60T 2230/03* (2013.01); *B60T 2250/03* (2013.01); *B60T 2270/82* (2013.01)

(58) Field of Classification Search
CPC .......... B60T 7/22; B60T 13/161; B60T 7/042; B60T 17/02; B60T 8/1755; B60T 8/17551; B60T 8/172; B60T 2220/04; B60T 2270/82; B60T 2201/022; B60T 2250/03; B60T 2201/03; B60T 2230/03

USPC .......... 701/70–91; 303/3, 146, 15, 155, 167; 188/72.2; 60/548, 552
See application file for complete search history.

(56) References Cited

U.S. PATENT DOCUMENTS

| | | | | |
|---|---|---|---|---|
| 2006/0250297 | A1* | 11/2006 | Prakah-Asante | ... B60R 21/0134 342/70 |
| 2010/0168998 | A1* | 7/2010 | Matsunaga | ........... B60W 30/10 701/532 |
| 2012/0256479 | A1* | 10/2012 | Bunk | ........................ B60T 8/36 303/20 |
| 2013/0238207 | A1* | 9/2013 | Gonzalez Romero | ........................ B60T 8/3275 701/70 |
| 2013/0297168 | A1* | 11/2013 | Svensson | .............. B60T 8/1755 701/70 |
| 2015/0274161 | A1* | 10/2015 | Stierlin | .................. G08G 1/163 382/104 |
| 2015/0283985 | A1* | 10/2015 | Korthals | ................... B60T 7/22 701/70 |
| 2017/0267218 | A1* | 9/2017 | Bunk | ...................... B60T 7/042 |

* cited by examiner

*Primary Examiner* — Shardul D Patel
(74) *Attorney, Agent, or Firm* — Raymond L. Coppiellie; Burgess Law Office, PLLC

(57) ABSTRACT

A method for operating a braking assistance system of a vehicle, wherein the braking assistance system assists a braking of the vehicle by a vehicle braking device in the event of a hazard braking. To differentiate between the hazard braking and a normal braking, at least two variables, representing a braking demand of a driver of the vehicle, are ascertained and a threshold value is established for each variable wherein hazard braking is recognized when at least the two variables exceed their particular threshold value, whereupon an automated braking intervention by the braking assistance system is initiated with the aid of the vehicle braking device. Furthermore, at least one driving-situation variable representing the instantaneous driving situation of the vehicle is ascertained and the at least two threshold values are changed depending on the at least one driving-situation variable.

18 Claims, No Drawings

METHOD FOR OPERATING A VEHICLE BRAKING ASSIST SYSTEM

CROSS-REFERENCE TO RELATED APPLICATIONS

Not Applicable.

BACKGROUND OF THE INVENTION

1. Field of the Invention

The present invention relates to a method for operating a braking assistance system of a vehicle.

2. Description of Related Art

Braking assistance systems were developed based on investigations showing that normal drivers in emergency braking situations are often unable to apply the necessary braking force via the brake pedal, or do so only with delay. After recognition of a driver demand, braking assistance systems automatically apply a certain braking force after a predetermined delay and/or after the detection of a critical driving situation indicating a hazard situation or an emergency braking situation. Recognition driver demand or detection of a hazardous or emergency braking situation is carried out, for example, by a control unit of an electronic stability control (ESC) of the vehicle. The system automatically increases the braking force, as compared to the braking force applied by the vehicle driver, preferably up to the maximum braking force (wheel-lock limit) to achieve a shortest possible braking distance. Typically, the braking pressure is increased, for example with a pump of the antilock brake system (ABS), until all wheels of the vehicle are under the ABS control, whereby a maximum braking of the vehicle is achieved.

In known braking assistance systems, the distinction between hazard braking and normal braking is based on the determination of a critical braking-pressure threshold value and a critical braking-pressure gradient threshold value, wherein the braking pressure is determined in a main brake cylinder of a braking device of the vehicle. Upon exceeding both threshold values in a braking situation, the system recognizes a hazard situation, braking force is automatically applied by the braking assistance system via the vehicle braking device, to permit the vehicle to be braked with a maximum braking force.

SUMMARY OF THE INVENTION

A method for braking a vehicle including ascertaining two variables, each representing a vehicle driver braking demand and establishing a threshold value for each variable, wherein braking occurs when the two variables each exceed their particular threshold value so, an automated braking intervention by the braking assistance system initiates the vehicle braking device. The method includes ascertaining at least one driving-situation variable representing an instantaneous driving situation of the vehicle and changing the threshold values depending on the at least one driving-situation variable and ascertaining one of the variables representing a vehicle driver braking demand from a first variable associated with a braking pressure in a main brake cylinder of the vehicle braking device actuated by a brake pedal and ascertaining the other of the variables representing the braking demand of the driver from a second variable associated with a change over time of the braking pressure in the main brake cylinder of the vehicle braking device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

One method, according to an exemplary embodiment of the present invention, for operating a braking assistance system of a vehicle assisting vehicle braking in the event of a hazard braking, includes differentiating between hazard braking and normal braking by ascertaining at least two variables representing a braking demand of a driver of the vehicle and establishing a threshold value for each variable. Hazard braking is recognized when each variable exceeds an established particular threshold value for that variable, whereupon the braking assist system initiates an automated braking intervention with the aid of a vehicle braking device. In addition, according to the invention, at least one driving-situation variable, representing the instantaneous driving situation of the vehicle is ascertained, whereby the two threshold values change or vary depending on the at least one driving-situation variable. An optimal adaptation of the behavior of the braking assistance system to a known driving-situation variable can be achieved, achieving an effective braking behavior of the vehicle. Driving-situation variables can include, for example, vehicle-dynamics variables of the vehicle, for example, a yaw rate, a roll rate and/or a pitch rate of the vehicle, a vehicle speed and the like, and, for example, environmental variables of the vehicle, which are detected with a camera sensor system, an infrared sensor system, a radar sensor system and/or an exterior-temperature or ambient-temperature sensor system, and the like.

The first variable representing the braking demand of the driver is furthermore ascertained from a first variable correlated with a braking pressure prevailing in a main brake cylinder of the vehicle braking device, actuated by a brake pedal, and the second variable representing the braking demand of the driver ascertained from a second variable correlated with a change over time of the braking pressure prevailing in the main brake cylinder of the vehicle braking device. The braking pressure and the change over time of the braking pressure are not ascertained directly in/at the main brake cylinder of the vehicle braking device, for example, by an appropriately provided and situated pressure sensor, but rather indirectly, by utilizing variables correlated with the braking pressure in the main brake cylinder; i.e., on the basis of which the braking pressure in the main brake cylinder can be inferred. In this way, the method no longer relies on a direct determination of the braking pressure in the main brake cylinder and, therefore, can be utilized in a substantially more flexible way. In addition, the method according to the invention offers a further advantage of a reliable operation if the pressure in the main brake cylinder of the vehicle braking device does not allow for a reliable finding regarding the influencing of the particular threshold values or the activation or deactivation of the braking assistance system.

According the invention, the vehicle braking device is a brake-by-wire braking device used to carry out vehicle braking. The method also utilizing a brake-by-wire braking device, because determination of the braking pressure or the change over time of the braking pressure no longer necessarily needs to take place directly at the main brake cylinder of the vehicle braking device.

For example, brake pedal travel can be determined as a variable from which the first variable representing the braking demand of the driver is determined, and a change over time of the brake pedal travel, i.e., a brake pedal speed, can be determined as another variable from which the second variable representing the braking demand of the driver is determined. The brake pedal travel can be determined, for example, by a travel sensor appropriately provided and situated on the brake pedal of the vehicle braking device.

A braking-device system pressure can also be determined as a variable from which the first variable representing the braking demand of the driver is determined, and a change over time of the braking-device system pressure can be determined as a variable from which the second variable representing the braking demand of the driver is determined. The braking-device system pressure is considered to be the braking pressure available in the vehicle braking device, in particular being present at the wheels, for braking the wheels of the vehicle. The braking-device system pressure can be determined, for example, by one or more pressure sensors provided and situated on the vehicle braking device.

A pump setting of a pump generating a braking-device system pressure can also be determined as the variable from which the first variable representing the braking demand of the driver is determined, and a change over time of the pump setting, i.e., the pump speed, can be determined as a variable from which the second variable representing the braking demand of the driver is determined. The braking-device system pressure is considered to be the braking pressure available in the vehicle braking device, in particular being present at the wheels, for braking the wheels of the vehicle. For example, the pump can include one or more pistons that displace a brake fluid in the vehicle braking device, in particular in the lines leading to the wheels of the vehicle to be braked, whereby a corresponding braking-device system pressure that acts at the wheels for braking, can be generated. The position of the piston or pistons can be determined, for example, by an appropriately provided and situated travel sensor.

A motor setting of a pump motor that generates a braking-device system pressure can also be determined as the variable from which the first variable representing the braking demand of the driver is determined, and a change over time of the motor setting, i.e., the motor speed, can be determined as the variable from which the second variable representing the braking demand of the driver is determined. The braking-device system pressure is considered to be the braking pressure available in the vehicle braking device, in particular being present at the wheels, for braking the wheels of the vehicle. The motor setting can be determined, for example, by a rotation-angle sensor provided and situated on the motor, and/or the motor speed can be determined by a speed sensor correspondingly provided and situated on the motor.

A probability of the vehicle colliding with an obstacle, determined by a system including a camera sensor system, an infrared sensor system and/or a radar sensor system, can be determined as the driving-situation variable. An ambient temperature of the vehicle determined by a temperature sensor system can be determined as the driving-situation variable. Likewise, a roll rate of the vehicle determined by a roll-rate sensor system can be determined as the driving-situation variable. Yaw rate information regarding the vehicle, which is determined with a yaw-rate sensor system, may also be determined as the driving-situation variable.

The threshold value delimiting the first variable representing the braking demand of the driver and the second threshold value delimiting the second variable representing the braking demand of the driver are both reduced when the ascertained driving-situation variable indicates that a hazard situation is present with respect to the hazard braking. It is therefore possible to achieve an earlier activation of the braking assistance system depending on the determined driving-situation variable and, therefore, to substantially shorten the braking distance of the vehicle as compared to otherwise constant threshold values.

For example, if an imminent collision of the vehicle with an obstacle is detected by the camera sensor system, the infrared camera system, or the radar sensor system and a high collision probability is determined, the threshold value that delimits the first variable representing the braking demand of the driver, and the threshold value that delimits the second variable representing the braking demand of the driver can be reduced accordingly.

Likewise, for example, when the external or ambient temperature of the vehicle ascertained by the temperature sensor system is determined as the driving-situation variable, then, at low ambient temperatures of the vehicle, for example, at temperatures below 0° C., at which the deceleration of the vehicle is reduced at a certain braking pressure due to reduced friction values of the brake pads, and the change over time of the braking pressure is reduced due to an increased viscosity of the brake fluid in the vehicle braking device, the threshold value that delimits the first variable representing the braking demand of the driver, and the threshold value that delimits the second variable representing the braking demand of the driver are reduced in such a way that high braking effectiveness can still be achieved even at these low temperatures.

The threshold value that delimits the first variable representing the braking demand of the driver, and the threshold value that delimits the second variable representing the braking demand of the driver can also be reduced so for example, when the roll rate of the vehicle determined by the roll-rate sensor system, in particular a roll rate critical for a roll stability control (RSC) of the vehicle, is determined as the driving-situation variable. A critical roll rate of the vehicle is present, for example, during an event which activates the roll stability control.

The threshold value that delimits the first variable representing the braking demand of the driver, and the threshold value that delimits the second variable representing the braking demand of the driver can likewise be reduced so for example, when the yaw rate information of the vehicle ascertained by the yaw-rate sensor system, in particular a yaw rate critical for an electronic stability control (ESC) of the vehicle, is determined as the driving-situation variable. A critical yaw rate in this sense is present, for example, during an event which activates the electronic stability control. It can also be present already, however, when a certain yaw rate of the vehicle is exceeded.

Preferably, a critical yaw rate is reached, for example, when a yaw rate factor of approximately 0.8 is exceeded. Here, the yaw rate factor is defined as the quotient of a present deviation in the direction of travel and the deviation in the direction of travel at which the electronic stability control is activated. The present deviation in the direction of travel is determined from the difference between the present direction of travel of the vehicle and the desired direction of travel specified by the driver. The deviation in the direction of travel at which the electronic stability control is activated is a set value predetermined for the electronic stability control. The directions are each measured about the vertical or yaw axis of the vehicle. The yaw rate factor therefore indicates the ratio of the present deviation in the direction of travel from the deviation in the direction of travel at which the electronic stability control is activated.

Another determinable and critical piece of yaw rate information can also be formed by the time derivative of the yaw rate factor. The time derivative of the yaw rate factor is a measure of the change over time of the yaw rate factor. In this way, the threshold value that delimits the first variable representing the braking demand of the driver, and the threshold value that delimits the second variable representing the braking demand of the driver can be reduced so for example, when the yaw rate information of the vehicle ascertained by the yaw-rate sensor system, in particular a critical time derivative of the yaw rate factor, is determined as the driving-situation variable.

A combination of the present value of the yaw rate factor and the time derivative of the yaw rate factor can be utilized for forming the determinable and critical piece of yaw rate information that is determined as the driving-situation variable. In this way, for example, the threshold value for exceeding a certain yaw rate factor can be reduced as soon as the time derivative of the yaw rate factor assumes a high value.

The direction of the present deviation in the direction of travel, whether the vehicle oversteers or understeers, can also be utilized for forming the yaw rate information, to correspondingly reduce the threshold value that delimits the first variable representing the braking demand of the driver, and the threshold value that delimits the second variable representing the braking demand of the driver.

The threshold value that delimits the first variable representing the braking demand of the driver is multiplied by a first factor resulting from the ratio of a brake-pad friction coefficient at an ambient temperature of the vehicle, to be determined, and a brake-pad friction coefficient at a determinable first reference temperature, for example, approximately 100° C., and the second threshold value that delimits the second variable representing braking demand of the driver is multiplied by a second factor resulting from the ratio of a brake-fluid viscosity value at the determined ambient temperature and a brake-fluid viscosity value at a determinable second reference temperature, for example, approximately 20° C., when the determined driving-situation variable indicates that a hazard situation is present with respect to the hazard braking.

Both the threshold value that delimits the first variable representing the braking demand of the driver, and the threshold value that delimits the second variable representing the braking demand of the driver can be reduced—only in the event of the temperature falling below a certain external or ambient temperature of the vehicle, for example approximately 20° C., multiplied by the first or the second factor and, therefore, in comparison to the respective threshold values—before falling below the certain external or ambient temperature.

The aforementioned cases ensure that the braking assistance system achieves high braking effectiveness even at low external temperatures at which the braking effectiveness is reduced per se.

A braking-device system pressure is determined as the first variable and a change over time of the braking-device system pressure is determined as the second variable, and the threshold value that delimits the first variable representing the braking demand of the driver is reduced to a value between approximately 10 bar and approximately 30 bar, and the second threshold value that delimits the second variable representing the braking demand of the driver is reduced to a value between approximately ⅓ and approximately ½ of the same threshold value for a normal braking when the determined driving-situation indicates that a hazard situation is present with respect to the hazard braking.

At least one roll rate of the vehicle, determined by a roll-rate sensor system, is determined as the vehicle-situation variable and the threshold value that delimits the first variable representing the braking demand of the driver and the threshold value that delimits the second variable representing the braking demand of the driver are both reduced to a value of approximately 0 when the determined driving-situation variable indicates that a hazard situation is present with respect to the hazard braking. A hazard situation is present, for example, during an event that activates a roll stability control (RSC), for example, when a certain roll rate of the vehicle is exceeded. In such a case, the roll stability control of the vehicle can be assisted in an optimal way by reducing the two threshold values to a value of approximately 0. In this case, the slip of the wheels or tires of the vehicle, that are not relevant for the roll stability control, is reduced by the ABS, but the wheels or tires that are relevant for the roll stability control are advantageously brought to the wheel-lock limit as rapidly as possible. This not only improves the braking effect provided by the braking assistance system, but rather also allows for, in a particular way, a reaction by the roll stability control, which is as rapid as possible, to stabilize the vehicle.

The above-described method according to the invention for operating a braking assistance system of a vehicle, in particular a motor vehicle, is not limited to the embodiments disclosed herein, but rather also includes further, identically acting embodiments.

The method of the invention, according to one of the above-described embodiments, is utilized for operating a braking assistance system in a vehicle, in particular a motor vehicle. In an exemplary embodiment, the vehicle includes a brake-by-wire braking system used to carry out braking of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for braking a vehicle comprising:
   providing a vehicle braking device, including a brake pedal;
   providing a brake pedal sensor, said brake pedal sensor providing a brake pedal travel signal;
   using said brake pedal travel signal to ascertain a brake pedal travel and brake pedal speed, each representing a vehicle driver braking demand and establishing a threshold value for each of said brake pedal travel and said brake pedal speed, wherein an automated braking intervention by a braking assistance system occurs when said brake pedal travel and said brake pedal speed exceed their particular threshold value;

providing the vehicle with a hazard situation sensor generating a sensor output, using said sensor output to generate a hazard situation indication, and changing the threshold values based on the hazard situation indication.

2. The method of claim 1 the vehicle braking device is a brake-by-wire braking device.

3. The method of claim 1 wherein said hazard situation sensor includes a collision sensor, said collision sensor generating an output indicative of an imminent collision.

4. The method of claim 1 wherein said sensor includes at least one of a camera sensor system, an infrared sensor system, a radar sensor system, a temperature sensor system, a roll-rate sensor system, and a yaw rate sensor system.

5. The method of claim 1 including reducing the threshold value of the brake pedal travel and brake pedal speed based on the hazard situation indication.

6. The method of claim 1 including multiplying the threshold value of the brake pedal travel by a first factor based on a ratio of a brake-pad friction coefficient at an ambient temperature of the vehicle and a brake-pad friction coefficient at a determinable first reference temperature; and
multiplying the threshold value of the brake pedal speed by a second factor based on a ratio of a brake-fluid viscosity value at the ambient temperature and a brake-fluid viscosity value at the reference temperature when the determined driving-situation variable indicates a hazard situation is present.

7. The method of claim 1 wherein the sensor includes a roll-rate sensor system; and
reducing both the brake pedal travel and brake pedal speed threshold values to a value of approximately 0 when a signal from the roll-rate sensor generates the hazard situation indication.

8. The method of claim 1 including a yaw rate sensor system; and
the yaw rate sensor system generating yaw rate information, said yaw rate information used to generate the hazard situation indication.

9. The method of claim 1 wherein the threshold value for the brake pedal travel representing the braking demand of the driver is multiplied by a first factor that results from the ratio of a brake-pad friction coefficient at a determined ambient temperature of the vehicle and a brake-pad friction coefficient at a determinable first reference temperature, and the threshold value for the brake pedal speed representing braking demand of the driver is multiplied by a second factor that results from the ratio of a brake-fluid viscosity value at the determined ambient temperature and a brake-fluid viscosity value at a determinable second reference temperature when a hazard situation indication is generated.

10. A method for braking a vehicle comprising:
providing a vehicle braking device, including a pump generating a brake device system pressure;
determining a brake device system pressure based on a pump pressure setting;
determining a change in the brake device system pressure based on said pump pressure setting over time;
said brake pressure pump setting and said change in the brake device system pressure over time representing a vehicle driver braking demand and establishing a threshold value for each of said brake pressure pump setting and said change in the brake device system pressure over time wherein an automated braking intervention by a braking assistance system occurs when said brake pressure pump setting and said change in the brake device system pressure exceed their particular threshold value;
providing a said vehicle with a hazard situation sensor, said sensor generating and output used to generate a hazard situation indication and changing the threshold values based on the hazard situation indication.

11. The method of claim 10 including reducing the threshold value braking pressure pump setting to a value between approximately 10 bar and approximately 30 bar; and
reducing the change in the brake device system pressure over time to a value between approximately ⅓ and approximately ½ of the threshold value based on the hazard situation indication.

12. The method of claim 10 wherein said hazard situation sensor includes at least one of a camera sensor system, an infrared sensor system, a radar sensor system, a temperature sensor system, a roll-rate sensor system, and a yaw rate sensor system.

13. The method of claim 10 wherein the sensor includes a roll-rate sensor system; and
reducing both the brake pressure pump setting and said change in the brake device system pressure over time threshold values to approximately 0 when a signal from the roll-rate sensor generates the hazard situation indication.

14. The method of claim 10 wherein said hazard situation sensor includes a collision sensor, said collision sensor generating an output indicative of an imminent collision.

15. A method for braking a vehicle comprising:
providing a vehicle braking device, including a pump motor, said pump motor driving a pump to generate a brake device system pressure;
determining a brake device system pressure based on a pump motor setting;
determining a change in the brake device system pressure based on said pump motor setting over time;
said pump motor setting and said change in the brake device system pressure based on said pump motor over time representing a vehicle driver braking demand, and establishing a threshold value for each of said pump motor setting and said change in the brake device system pressure based on said pump motor over time wherein an automated braking intervention by a braking assistance system occurs when said pump motor setting and said change in the brake device system pressure based on said pump motor setting exceed their particular threshold value;
providing the vehicle with a hazard situation sensor, said sensor generating an output used to generate a hazard situation indication and changing the threshold values based on the hazard situation indication.

16. The method of claim 15 wherein said hazard situation sensor includes at least one of a camera sensor system, an infrared sensor system, a radar sensor system, a temperature sensor system, a roll-rate sensor system, and a yaw rate sensor system.

17. The method of claim 15 wherein the sensor includes a roll-rate sensor system; and
reducing both the pump motor setting and said change in the brake device system pressure based on said pump motor over time threshold values to approximately 0 when a signal from the roll-rate sensor generates the hazard situation indication.

18. The method of claim 15 wherein said hazard situation sensor includes a collision sensor, said collision sensor generating an output indicative of an imminent collision.

\* \* \* \* \*